United States Patent
Shibata et al.

(10) Patent No.: US 11,082,297 B2
(45) Date of Patent: Aug. 3, 2021

(54) NETWORK SYSTEM AND MANAGEMENT METHOD AND APPARATUS THEREOF

(71) Applicant: NEC CORPORATION, Tokyo (JP)

(72) Inventors: Seiya Shibata, Tokyo (JP); Takashi Takenaka, Tokyo (JP); Hideo Hasegawa, Tokyo (JP); Satoru Ishii, Tokyo (JP); Shintaro Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/089,145

(22) PCT Filed: Mar. 27, 2017

(86) PCT No.: PCT/JP2017/012224
§ 371 (c)(1),
(2) Date: Sep. 27, 2018

(87) PCT Pub. No.: WO2017/170312
PCT Pub. Date: Oct. 5, 2017

(65) Prior Publication Data
US 2019/0109765 A1   Apr. 11, 2019

(30) Foreign Application Priority Data
Mar. 31, 2016 (JP) .............................. JP2016-070564

(51) Int. Cl.
*H04L 12/24* (2006.01)
*G06F 9/455* (2018.01)

(52) U.S. Cl.
CPC ...... *H04L 41/0893* (2013.01); *G06F 9/45558* (2013.01); *H04L 41/0806* (2013.01);
(Continued)

(58) Field of Classification Search
CPC . H04L 41/0893; H04L 41/0806; H04L 41/12; H04L 41/5041; H04L 41/5054; G06F 9/45558
(Continued)

(56) References Cited

U.S. PATENT DOCUMENTS

| | | | |
|---|---|---|---|
| 2016/0359805 A1* | 12/2016 | Spraggs | H04L 41/0806 |
| 2017/0264680 A1* | 9/2017 | Palermo | G06F 30/34 |
| 2018/0041388 A1* | 2/2018 | Moens | H04L 67/10 |

FOREIGN PATENT DOCUMENTS

| | | |
|---|---|---|
| JP | 2005-33295 A | 2/2005 |
| JP | 2012-175418 A | 9/2012 |

(Continued)

OTHER PUBLICATIONS

Network Functions Virtualization (NFV)—Update White Paper, SDN and OpenFlow World Congress, Frankfurt-Germany, Oct. 15-17, 2013, 16 pages, (http://portal.etsi.org/NFV/NFV_White_Paper2.pdf).

(Continued)

*Primary Examiner* — Glenford J Madamba
(74) *Attorney, Agent, or Firm* — Sughrue Mion, PLLC

(57) ABSTRACT

A network system includes multiple processing units (21-1, 21-2, 22-1, 22-2) on each of which a desired virtual network function can be configured and a management apparatus that determines a communication path that connects the processing units so as to deploy a set of desired virtual network functions. At least one of the processing units includes a first communication interface that is connectable to any different processing unit and at least one second communication interface that is directly connectable to a predetermined different processing unit. The management apparatus determines the communication path for deploying the set of the desire virtual network functions, in accordance with respec-
(Continued)

tive connectable communication interfaces of the processing units.

14 Claims, 16 Drawing Sheets

(52) U.S. Cl.
CPC .......... *H04L 41/12* (2013.01); *H04L 41/5041* (2013.01); *H04L 41/5054* (2013.01); *G06F 2009/45595* (2013.01); *H04L 41/5077* (2013.01)

(58) Field of Classification Search
USPC ......................................................... 709/223
See application file for complete search history.

(56) References Cited

FOREIGN PATENT DOCUMENTS

| JP | 2016-40876 A | | 3/2016 |
|----|----|----|----|
| WO | 2015/117636 A1 | | 8/2015 |
| WO | WO 2015/117636 A | * | 8/2015 |

OTHER PUBLICATIONS

ETSI GS NFV 001 v1.1.1, "Network Functions Virtualization (NFV); Use Cases", Oct. 2013, 50 pages, (http://docbox.etsi.org/ISG/NFV/Open/Published/gs_NFV001v010101p%20-%20Use%20Cases.pdf).

PK GUPTA, Xeon + FPGA Platform for the Data Center, ISCA/CARL 2015, Intel, Jun. 2015, 24 pages.

International Search Report for PCT/JP2017/012224 dated Jun. 6, 2017 [PCT/ISA/210].

* cited by examiner

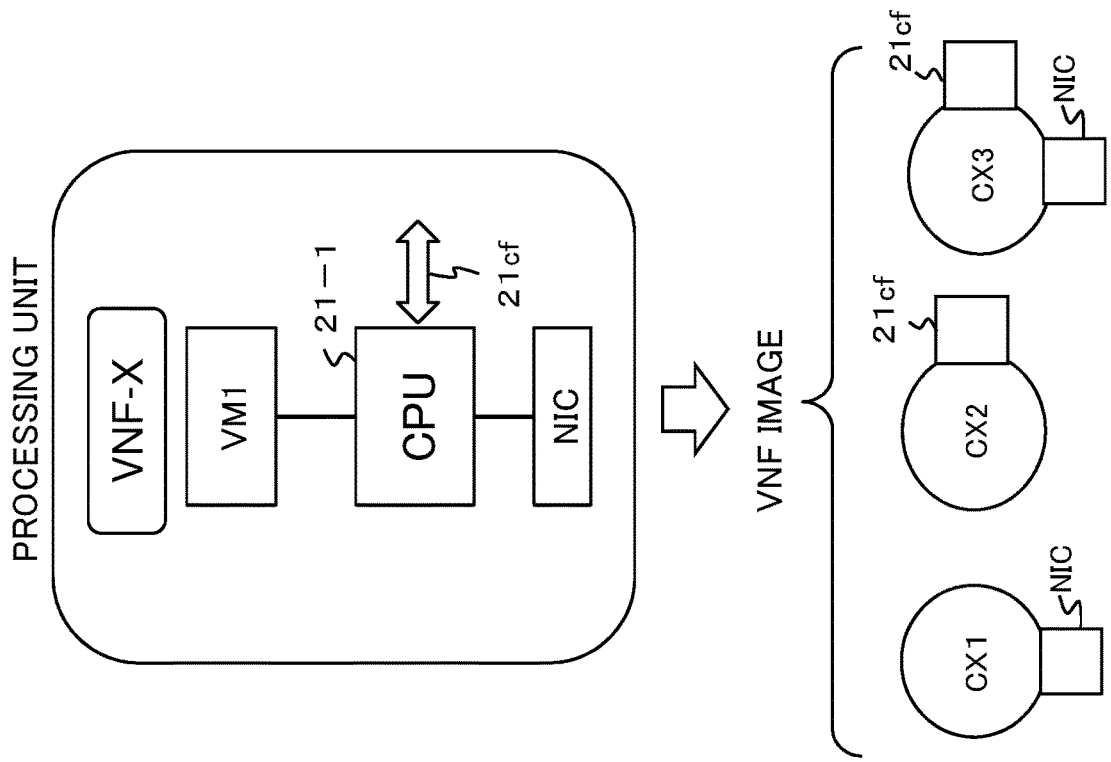

FIG. 4B
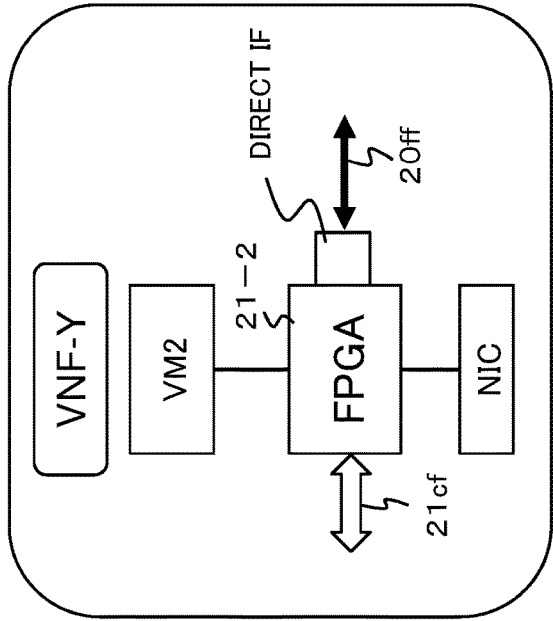
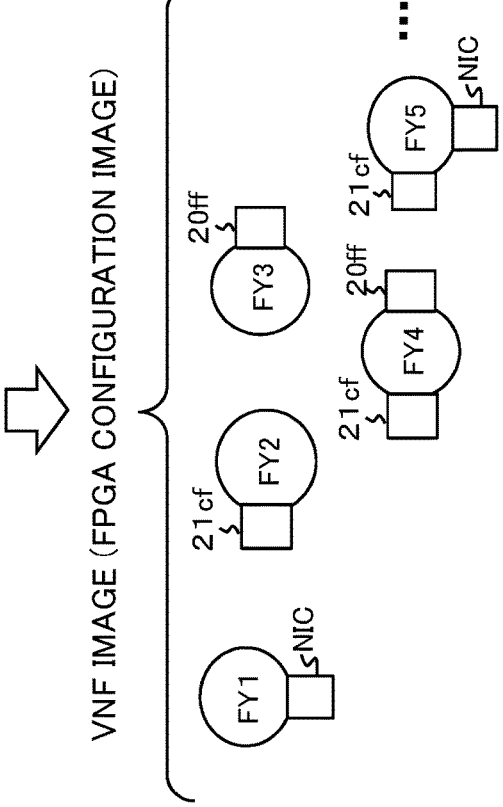

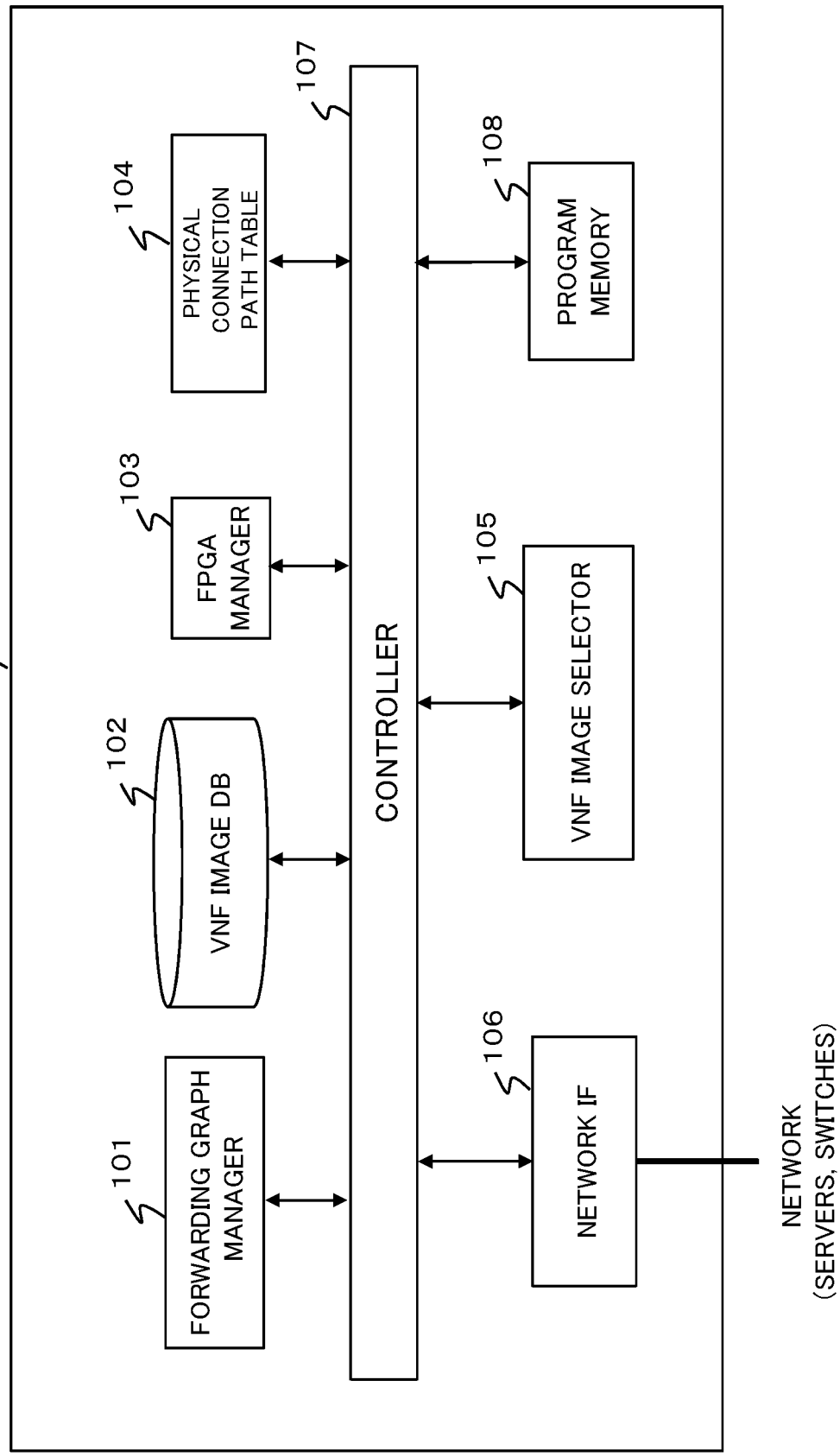

FIG. 10A

FORWARDING GRAPH MANAGER 101

| VNF | FROM | TO | MAP TO |
|---|---|---|---|
| X | - | Y | PROCESSING NODE A-CPU |
| Y | X | Z | PROCESSING NODE A-FPGA |
| Z | Y | - | PROCESSING NODE B-CPU |
| W | | - | PROCESSING NODE B-FPGA |
| | | - | PROCESSING NODE C-CPU |

FIG. 10B

VNF IMAGE DATABASE 102

| VNF | CPU | | | FPGA | | |
|---|---|---|---|---|---|---|
| | NIC | CPU-FPGA | DIRECT IF | NIC | CPU-FPGA | DIRECT IF |
| X | CX1 | CX2 | CX3 | FX1 | FX2 | FX3 |
| Y | CY1 | CY2 | CY3 | FY1 | FY2 | FY3 |
| Z | CZ1 | CZ2 | CZ3 | FZ1 | FZ2 | FZ3 |
| W | CW1 | CW2 | CW3 | FW1 | FW2 | FW3 |

FIG. 11A

FPGA MANAGER 103

| PROCESSING NODE | FPGA |
|---|---|
| A | INCLUDED |
| B | INCLUDED |
| C | NOT INCLUDED |

FIG. 11B

PHYSICAL CONNECTION PATH TABLE 104

| PROCESSING NODE | CPU-FPGA COMMUNICATION | FPGA DIRECT CONNECTION |
|---|---|---|
| A | YES | B |
| B | YES | A |
| C | NO | - |

NETWORK SYSTEM AND MANAGEMENT METHOD AND APPARATUS THEREOF

CROSS REFERENCE TO RELATED APPLICATIONS

This application is a National Stage of International Application No. PCT/JP2017/012224, filed on Mar. 27, 2017, which claims priority from Japanese Patent Application No. 2016-070564, filed on Mar. 31, 2016, the contents of all of which are incorporated herein by reference in their entirety.

TECHNICAL FIELD

The present invention relates to a network system including virtual network functions and, in particular to management techniques of the network system.

BACKGROUND ART

In current communication systems, various network functions (NFs), such as a broadband remote access server (BRAS), network address translation (NAT), a router, a firewall (FW), and deep packet inspection (DPI) are implemented by dedicated hardware devices (appliances). For this reason, when launching a new network service, the network operator is forced to introduce a new dedicated hardware device, requiring significant costs for purchasing appliances, installation spaces, and the like. Under such circumstances, there have been considered in recent years technologies that virtually implement network functions by software rather than by hardware devices (network function virtualization) (Non-Patent Literature 1). As an example of network service virtualization, Patent Literature 1 discloses a method by which multiple virtual routers are constructed on communication node devices and the resources of these virtual routers are dynamically distributed in accordance with communication quality.

There have been also considered technologies that provide various network services by transmitting a communication flow through a communication path obtained by combining multiple virtual network functions (VNFs) (for example, see Non-Patent Literature 2).

As illustrated in FIG. 1, in network function virtualization, network services are configured and managed by logical links between virtual network functions VNFs (forwarding graph). Here, a network service composed of five virtual network functions VNF-1 to VNF-5 is illustrated in an overlay network.

The virtual network functions VNF-1 to VNF-5 in this forwarding graph operate on processing nodes SV1 to SV4, such as general-purpose servers, in an NFV infrastructure (NFVI). By virtually operating carrier-grade functions on the general-purpose servers rather than dedicated servers, cost reduction and operability improvement can be achieved.

CITATION LIST

Patent Literature

[Patent Literature 1] Japanese Unexamined Patent Application Publication No. 2012-175418

Non-Patent Literature

[Non-Patent Literature 1] Network Functions Virtualization—Update White Paper, Oct. 15-17, 2013 at the "SDN and OpenFlow World Congress", Frankfurt-Germany (http://portal.etsi.org/NFV/NFV_White_Paper2.pdf).

[Non-Patent Literature 2] ETSI GS NFV 001 v1.1.1 (2013 October) "Network Functions Virtualization (NFV); Use Cases" (http://docbox.etsi.org/ISG/NFV/Open/Published/gs_NFV001v010101p%20-%20Use%20Cases. pdf).

SUMMARY OF THE INVENTION

Technical Problem

However, implementation of NFV using general-purpose processing nodes may cause a bottleneck in CPU (central processing unit) processing of a processing node, communication between processing nodes, or the like. Avoiding such a bottleneck requires speeding up the processing nodes. As a technology of speedup of CPU processing, there has been known an accelerator technology of connecting a field-programmable gate array (FPGA) to a CPU in addition to an increase of the number of CPU cores, (e.g., "Xeon+FPGA Platform for the Data Center" ISCA/CARL 2015 <http://www.ece.cmu.edu/~calcm/carl/lib/exe/fetch.php?media=car115-gupta.pdf>).

Assuming that a forwarding graph is formed by a network that uses such a processing node mounted with a chip in which a FPGA is tightly coupled with a CPU, not only the CPU but also FPGA act as the infrastructure of the VM/VNF. Accordingly, all communications between processing nodes and between CPU and FPGA are performed through network switches. As a result, the performance of the switch or the load state of the network may become a bottleneck in making network services faster and more efficient.

Accordingly, an object of the present invention is to provide a network system, a management method and apparatus thereof that can achieve high-speed and efficient network services by appropriately deploying VNFs that operate on a plurality of processing nodes.

Solution to Problem

A network system according to the present invention is a network system in which at least one virtual network function can be deployed, including: a plurality of processing units on each of which a desired virtual network function can be configured; and a management apparatus that determines a communication path that connects the plurality of processing units so as to deploy a set of desired virtual network functions, wherein at least one of the processing units has a first communication interface that is connectable to any different processing unit and at least one second communication interface that is directly connectable to a predetermined different processing unit, wherein the management apparatus determines the communication path for deploying the set of desire virtual network functions, in accordance with respective connectable communication interfaces of the processing units.

A management apparatus according to the present invention is a management apparatus of a network system in which at least one virtual network function can be deployed, wherein at least one of a plurality of processing units on each of which a desired virtual network function can be configured has a first communication interface that is connectable to any different processing unit and at least one second communication interface that is directly connectable to a predetermined different processing unit, the management apparatus comprising: a storage means that stores virtual network function images for each virtual network function, wherein the virtual network function images are formed from possible combinations of communication interfaces of each processing unit; and a control means that determines a communication path so as to deploy a set of desired virtual network functions, by selecting the virtual network function images.

A management method according to the present invention is a management method of a network system in which at least one virtual network function can be deployed, wherein at least one of a plurality of processing units on each of which a desired virtual network function can be configured has a first communication interface that is connectable to any different processing unit and at least one second communication interface that is directly connectable to a predetermined different processing unit, the management method comprising: storing, by a storage means, virtual network function images for each virtual network function, wherein the virtual network function images are formed from possible combinations of communication interfaces of each processing unit; and determining, by a control means, a communication path so as to deploy a set of desired virtual network functions, by selecting the virtual network function images.

Advantageous Effects of the Invention

As described above, according to the present invention, it is possible to provide the increased number of options about a communication path comprised of processing units on which VNFs operate, allowing suitable selection of a communication path to make network services faster and more efficient.

BRIEF DESCRIPTION OF DRAWINGS

FIG. 4A is a schematic diagram showing an example of a VNF image on a processing unit in the network system according to the present embodiment.

FIG. 4B is a schematic diagram showing another example of a VNF image on a processing unit in the network system according to the present embodiment.

FIG. 9 is a block diagram showing the configuration of a management apparatus according to a first example of the present invention.

FIG. 10A is a schematic diagram showing an example of management data in a forwarding graph manager in the management apparatus shown in FIG. 9.

FIG. 10B is a schematic diagram showing an example of a VNF image database in the management apparatus shown in FIG. 9.

FIG. 11A is a schematic diagram showing an example of management data in an FPGA manager in the management apparatus shown in FIG. 9.

FIG. 11B is a schematic diagram showing an example of a physical connection path table in the management apparatus shown in FIG. 9.

DESCRIPTION OF EMBODIMENTS

Overview of Embodiment

According to an embodiment of the present invention, a communication path to implement a network service is configured by selecting processing units each including at least one of multiple types of communication interfaces such that processing units can be coupled through their communication interfaces. Since a desired combination of the multiple types of communication interfaces can be made, it is possible to widen a choice of options of a communication path comprised of processing units on which virtual network functions (VNFs) operate, achieving a faster and more efficient communication path implementing a forwarding graph. In other words, although the same set of VNFs are employed to implement the forwarding graph by the processing units, possible communication paths can form different VNF images, from which a VNF image providing a faster communication path can be selected and deployed. Note that a communication interface includes both a physical interface and a virtual interface in the following descriptions.

<System>

First, referring to FIG. 2, an example of a system configuration to explain embodiments of the present invention will be described. This system configuration is an example simplified to avoid complication of the description and does not limit the present invention.

Figure 1:
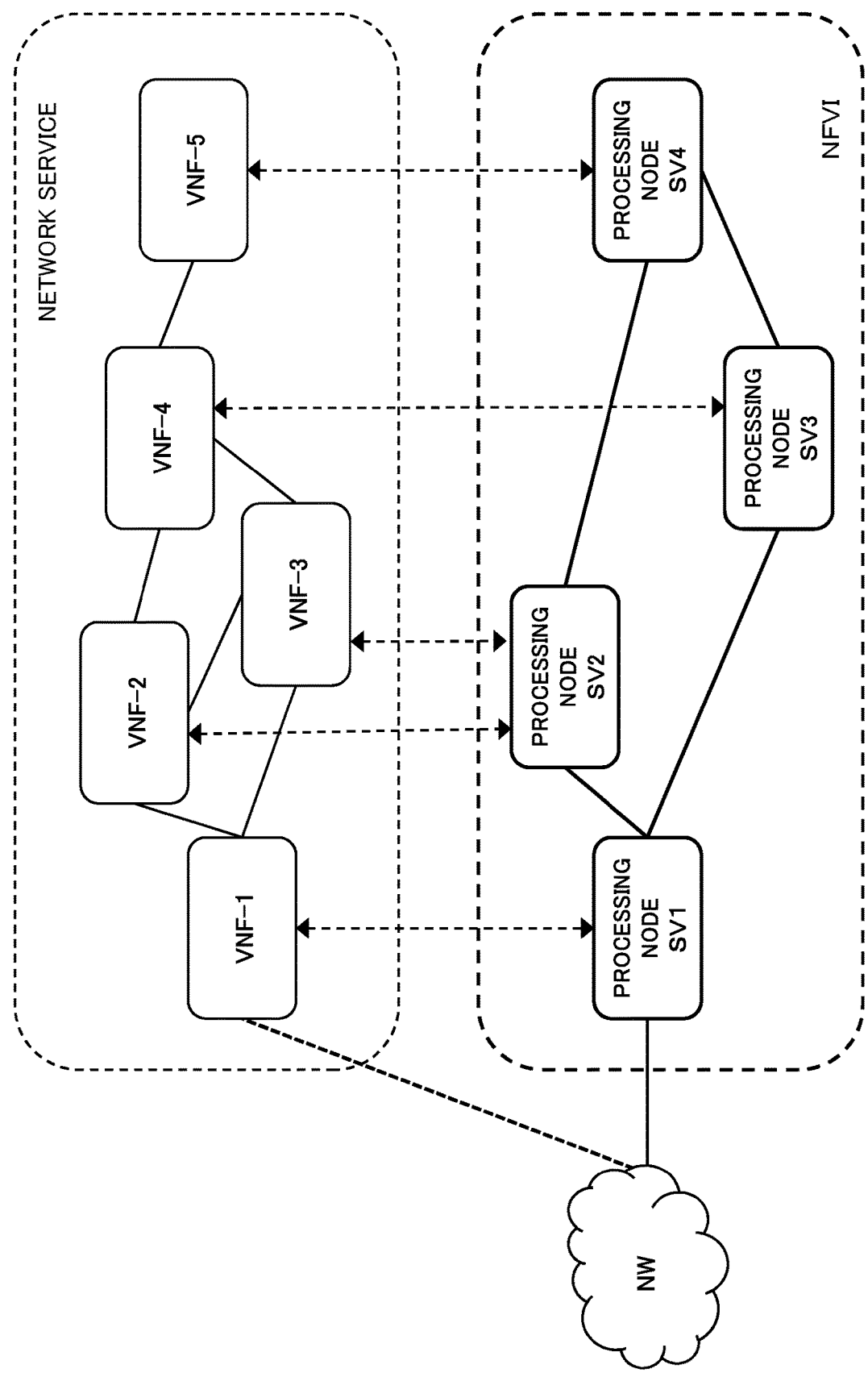
FIG. 1 is a schematic network diagram showing an example of network function virtualization.
Figure 2:
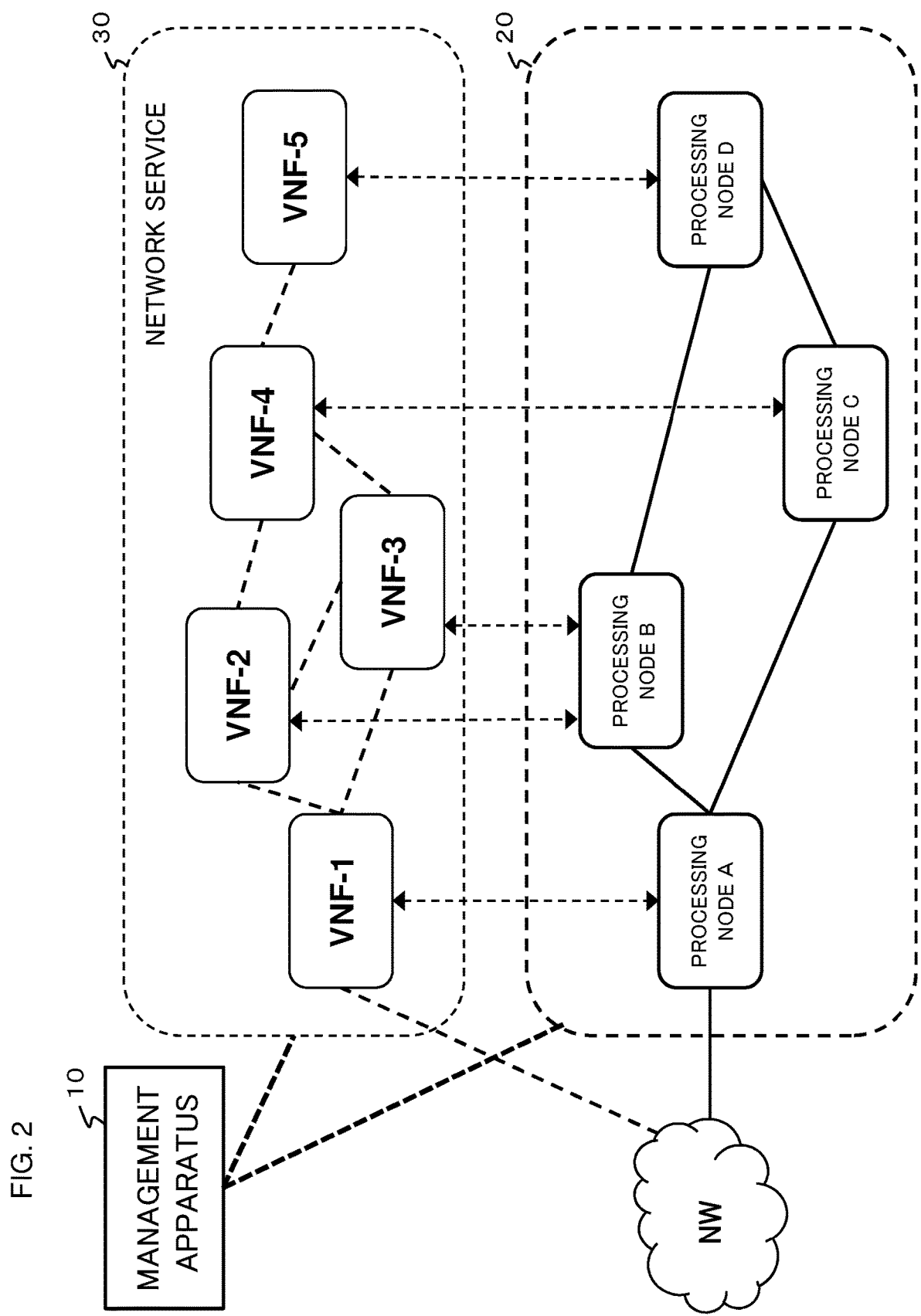
FIG. 2 is a schematic network diagram showing an example of a network system to which the present invention is applied.

As illustrated in FIG. 2, a management apparatus 10 manages a lower-layer network 20 including a plurality of processing nodes (e.g., servers) and an upper-layer network 30 including a plurality of VNFs. To simplify the diagram, it is assumed that the lower-layer network 20 includes processing nodes A, B, C, and D and the upper-layer network 30 includes virtual network functions VNF-1 to VNF-5.

It is assumed that at least one of the processing nodes in the lower-layer network 20 includes a plurality of processors. For example, in an embodiment described below, such a processing node is a server equipped with a programmable logic circuit (FPGA or the like) tightly coupled to a CPU. As will be discussed later, a programmable logic circuit is a hardware circuit which is capable of performing programmable routine processing at high speeds and of operating as an accelerator of the coupled CPU. A programmable logic circuit is advantageous in which it is able to perform a logic function desired by the user in a short period of time, as well as is rewritable. Hereafter, an FPGA will be described as an example of a programmable logic circuit, and a server in which a CPU and an FPGA are coupled with each other will be referred to as an FPGA-support processing node, and a server without an FPGA as an FPGA-non-support processing node.

Each of the VNFs in the upper-layer network 30 is set on a physical node in the lower-layer network 20. For example, in the system illustrated in FIG. 2, the VNF-1, VNF-4, and VNF-5 are set on the processing nodes A, C, and D, respectively, and the VNF-2 and VNF-3 are set on the single processing node B. The management apparatus 10 determines how to deploy the FPGA-support processing nodes and FPGA-non-support processing nodes. Now, an embodiment and examples of the present invention will be described in detail with reference to the drawings.

1. EMBODIMENT

In a network system according to an embodiment of the present invention, in addition to a communication interface between processing nodes through a network, the following communication interfaces are used: a communication interface between the CPU and the FPGA of a FPGA-support processing node; and a direct communication interface with the FPGA of another FPGA-support processing node, allowing a high-speed communication path without passing through the network or a network switch to be selected, and a desired forwarding graph can be implemented using the high-speed communication path. The present embodiment will be described below with reference to FIGS. 3 to 6.

1.1 System Configuration

Figure 3:
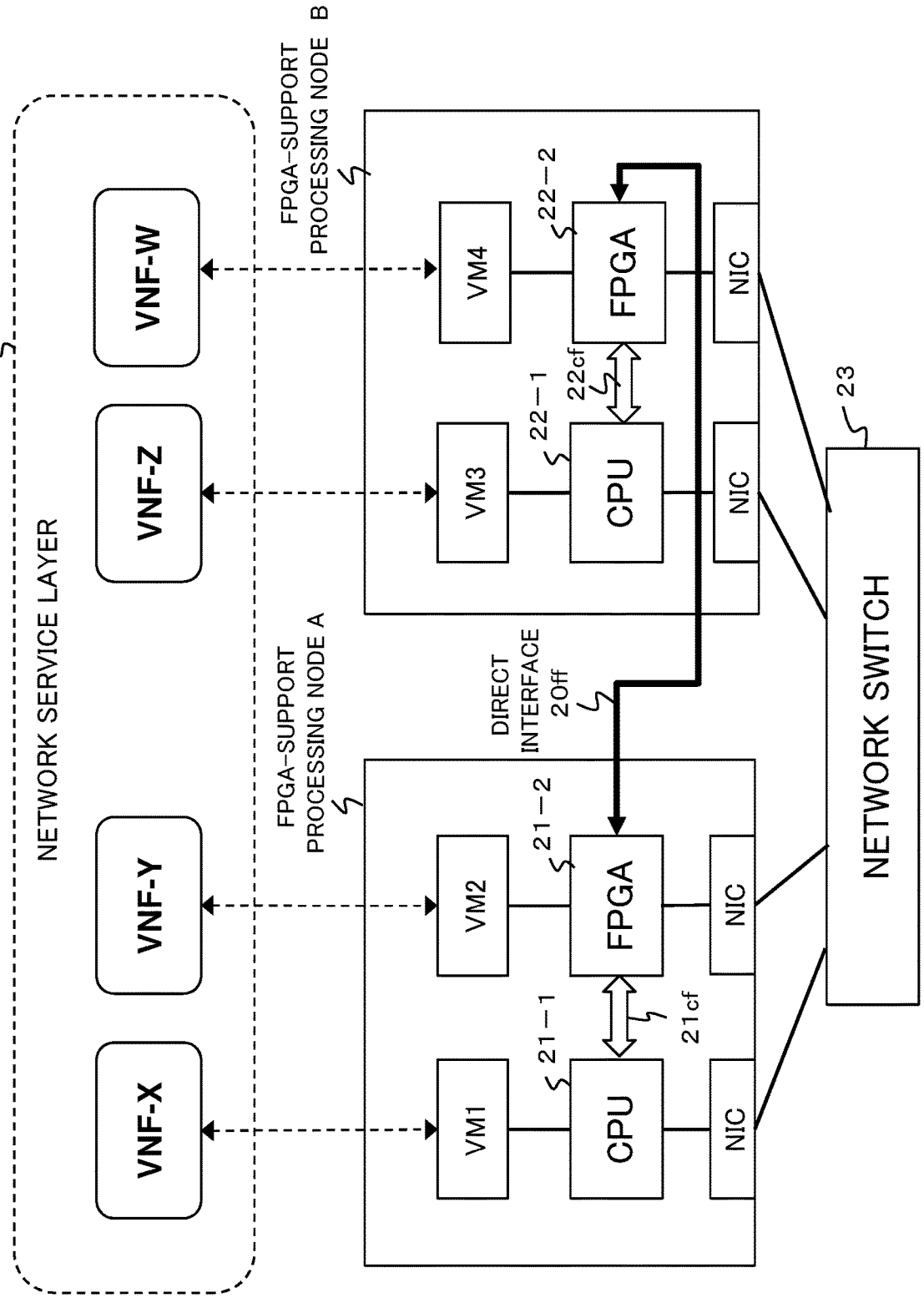
FIG. 3 is a schematic network diagram showing an example of the correspondences between physical processing nodes and virtual network functions in a network system according to one embodiment of the present invention.

As shown in FIG. 3, an FPGA-support processing node A in the lower-layer network 20 has a configuration in which a CPU 21-1 and an FPGA 21-2 are coupled with each other. In FIG. 3, it is assumed that a virtual machine VM1 is created on the CPU 21-1, a virtual machine VM2 is created on the FPGA 21-2, a VNF-X in the lower-layer network 20 is deployed on the virtual machine VM1, and a VNF-Y is deployed on the virtual machine VM2 on the FPGA 21-2. For example, the FPGA 21-2 can reconfigure a desired VNF by loading configuration data from the management apparatus 10. A plurality of virtual machines VMs may be created on the CPU 21-1 or FPGA 21-2, and VNFs may be deployed on these virtual machines.

Similarly, it is assumed that an FPGA-support processing node B is equipped with a CPU 22-1 and an FPGA 22-2, virtual machines VM3 and VM4 are created thereon, and a VNF-Z and a VNF-W are deployed on the VM3 and VM4, respectively. In other words, a VNF set as illustrated in FIG. 3 includes the VNF-X, VNF-Y, VNF-Z, and VNF-W, which are connected through one of multiple communication paths in the lower-layer network 20, allowing a desired forwarding graph to be implemented.

In the lower-layer network 20 of the present embodiment, there are available a communication interface 21cf or 22cf between the CPU and FPGA of each FPGA-support processing node and a communication interface 20ff between the FPGAs of the FPGA-support processing node. In general, VNFs that run on the CPU and the FPGA in an FPGA-support processing node are connected together through a network switch 23 and are also connected to a CPU or FPGA of another FPGA-support/-non-support processing node through the network switch 23. On the other hand, according to the present embodiment, VNFs can be connected through the communication interface 21cf or 22cf in each FPGA-support processing node. Also, the VNF on the FPGA of one FPGA-support processing node and the VNF on the FPGA of the other one can be connected through the high-speed interface 20ff between the FPGAs.

For example, in FIG. 3, the CPU 21-1 and FPGA 21-2 can communicate with each other through the communication interface 21cf, and the FPGA 21-2 and the CPU 22-1 of the other node B can communicate with each other through the network switch 23. Thus, a forwarding graph composed of VNF-X, VNF-Y, and VNF-Z can be implemented through the high-speed communication interface 21cf and the network switch 23. Also, the FPGA 21-2 and the FPGA 22-2 of the other node B can communicate with each other through the direct interface 20ff. Accordingly, a forwarding graph composed of VNF-X, VNF-Y, and VNF-W can be implemented through the high-speed communication interfaces 21cf and 20ff.

As described above, the interface between the CPU and FPGA in each FPGA-support processing node and the direct interface between the FPGAs of the FPGA-support processing nodes are added as options, resulting in a significantly wide range of selectable communication paths from which the fastest communication path can be determined.

Hereafter, it is assumed that each of CPUs and FPGAs that run VNFs is defined as a single processing unit, and that each processing unit includes one or more type of communication interface(s). A plurality of types of communication interfaces here include the NIC-side (network switch-side) interface of each processing node, the interface between the CPU and FPGA of each processing node, and the direct interface between the FPGAs of different processing nodes. Each processing unit includes at least one of these types of interfaces. Thus, the network system according to the present embodiment can be regarded as a network including multiple processing units. A plurality of possible communication paths can be generated using the possible interface of each processing unit, and the optimum communication path can be determined from the possible communication paths.

1.2 VNF Image

As described above, a processing unit on which one VNF runs includes at least one type of communication interface. Accordingly, this processing unit can have as many candidates for VNF as combinations of the possible communication interfaces thereof. Hereafter, these VNF candidates will be referred to as VNF images. VNF images will be described briefly below with reference to FIGS. 4A and 4B.

Referring to FIG. 4A, the CPU 21-1 on which the VNF-X runs includes the NIC-side interface and FPGA-side interface 21cf. Accordingly, its VNF images are three VNF candidates CX1, CX2, and CX3 which include the NIC-side interface, FPGA-side interface, and both of these interfaces, respectively. In the notation of these VNF images, "C" represents a CPU; "X" represents a running VNF; "1" represents an NIC-side interface; "2" represents an FPGA-side interface; "3" represents both NIC-side and FPGA-side interfaces.

Referring to FIG. 4B, the FGPA 21-2 on which the VNF-Y runs includes the NIC-side interface, CPU-side interface 21cf, and direct interface 20ff. Accordingly, as any combination of these interfaces, its VNF images are VNF candidates FY1, FY2, FY3, FY4, FY5, and so on, which include an NIC-side interface, a CPU-side interface, a direct interface, CPU-side and direct interfaces, NIC-side and CPU-side interfaces, and so on, respectively. In the notation of these VNF images, "F" represents an FPGA; "Y" represents a running VNF, "1" represents an NIC-side interface; "2" represents a CPU-side interface; "3" represents a direct interface; "4" represents both CPU-side and direct interfaces; and "5" represents both NIC-side and CPU-side interfaces. Note that the VNF and VM of the FGPA are configured by loading configuration data from the management apparatus 10. Examples of operations according to the present embodiment will be described below using the above notation.

1.3 Implementation of Forwarding Graph

Example 1

Figure 5:
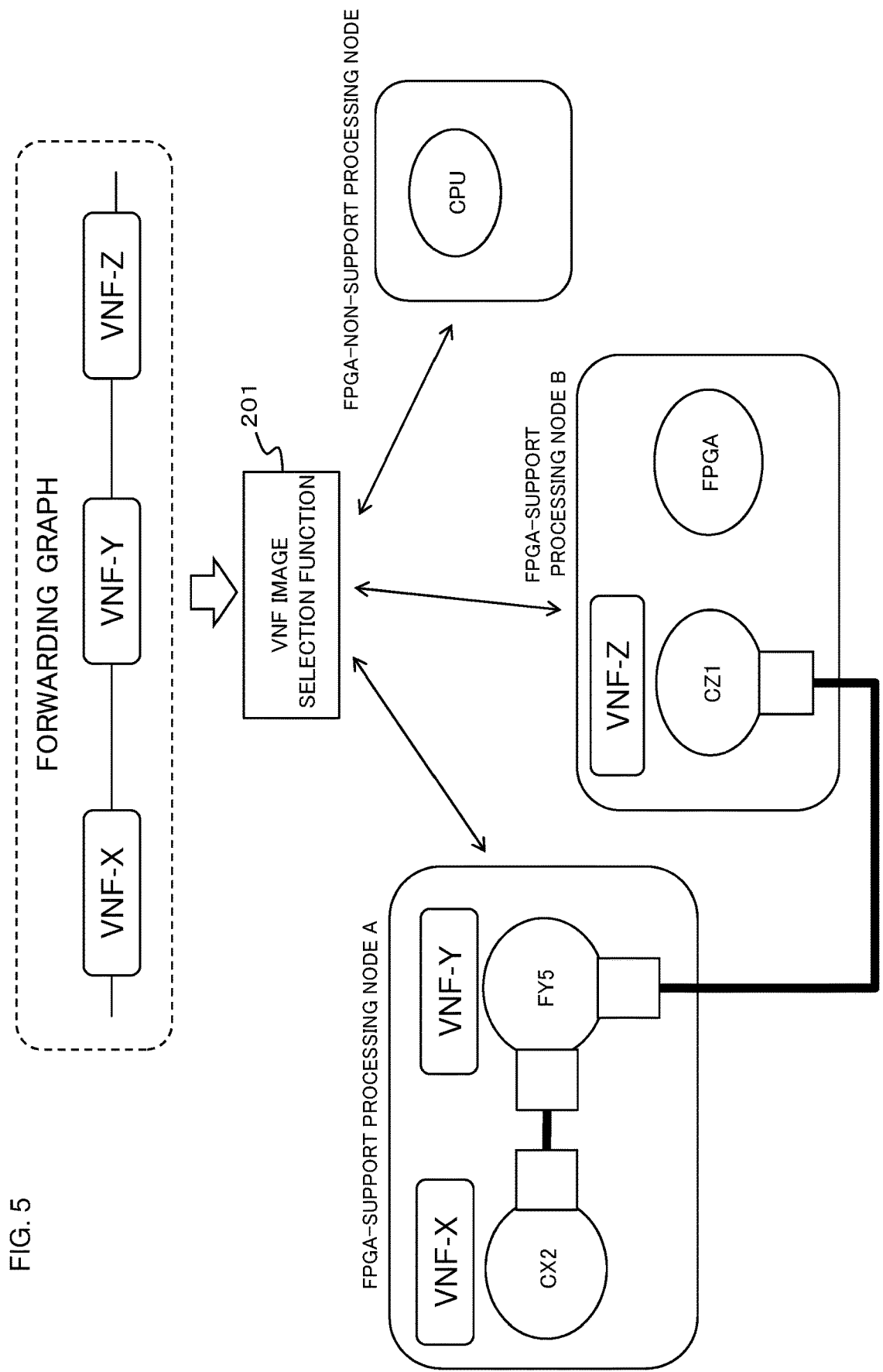
FIG. 5 is a schematic diagram showing an example of a communication path with respect to a forwarding graph formed according to the present invention.

As illustrated in FIG. 5, a VNF image selection function 201 of the management apparatus 10 selects an efficient communication path that implements a desired forwarding graph, from the above VNF images. For example, if the forwarding graph includes the VNF-X, VNF-Y, and VNF-Z, the VNF image selection function 201 selects the VNF image CX2 of the CPU 21-1 and the VNF image FY5 of the FPGA 21-2 in the FPGA-support processing node A and a VNF image CZ1 of the CPU 22-1 in the FPGA-support processing node B. Then, the VNF image selection function 201 connects the CPU 21-1 and FPGA 21-2 through the CPU-FPGA interface and connects the FPGA 21-2 and the CPU 22-1 of the FPGA-support processing node B through the network switch. Thus, a communication path that implements the forwarding graph VNF (X-Y-Z) can be formed. Since this communication path uses the high-speed CPU-FPGA interface, the communication path can enhance the speed of communication, compared to typical communication through the network switch.

Example 2

Figure 6:
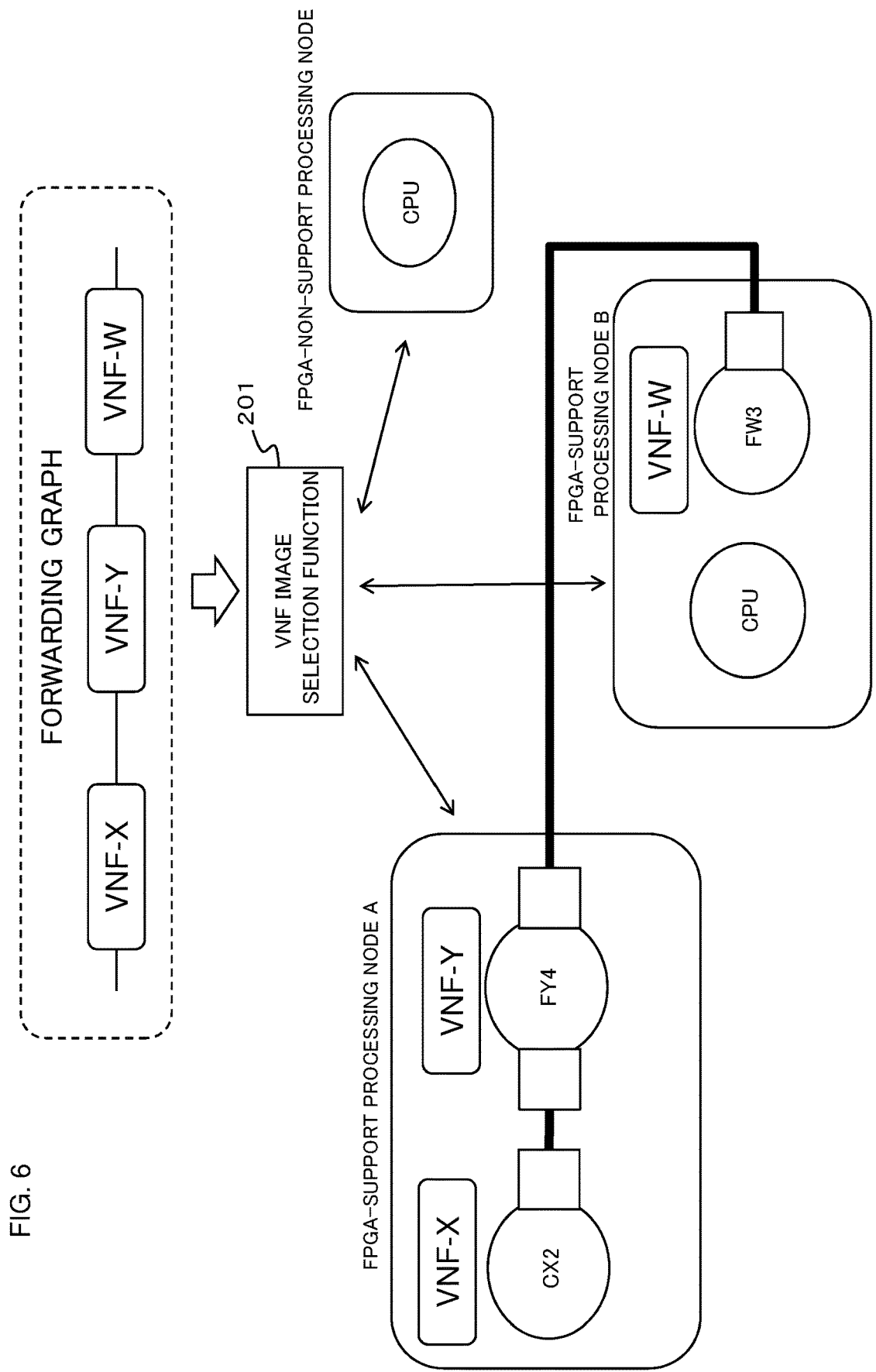
FIG. 6 is a schematic diagram showing another example of a communication path with respect to the forwarding graph formed according to the present invention.

As illustrated in FIG. 6, assuming that the forwarding graph is composed of a set of the VNF-X, VNF-Y, and VNF-W, the VNF image selection function 201 selects the VNF image CX2 of the CPU 21-1 and the VNF image FY4 of the FPGA 21-2 in the FPGA-support processing node A and a VNF image FW3 of the FPGA 22-2 in the FPGA-support processing node B. Then, the VNF image selection function 201 connects the CPU 21-1 and FPGA 21-2 through the CPU-FPGA interface and connects the FPGA 21-2 and the FPGA 22-2 through the fast interface 20*ff*. Thus, a communication path that implements the forwarding graph VNF (X-Y-W) can be formed. Since this communication path uses the high-speed CPU-FPGA interface and the high-speed FPGA-to-FPGA interface, the communication path can further enhance the speed of communication, compared to typical communication through the network switch.

Example 3

The above Examples 1 and 2 illustrate the case of determining the communication path at startup. The present embodiment can be also applied to the case of changing the communication path during operation.

Figure 7:
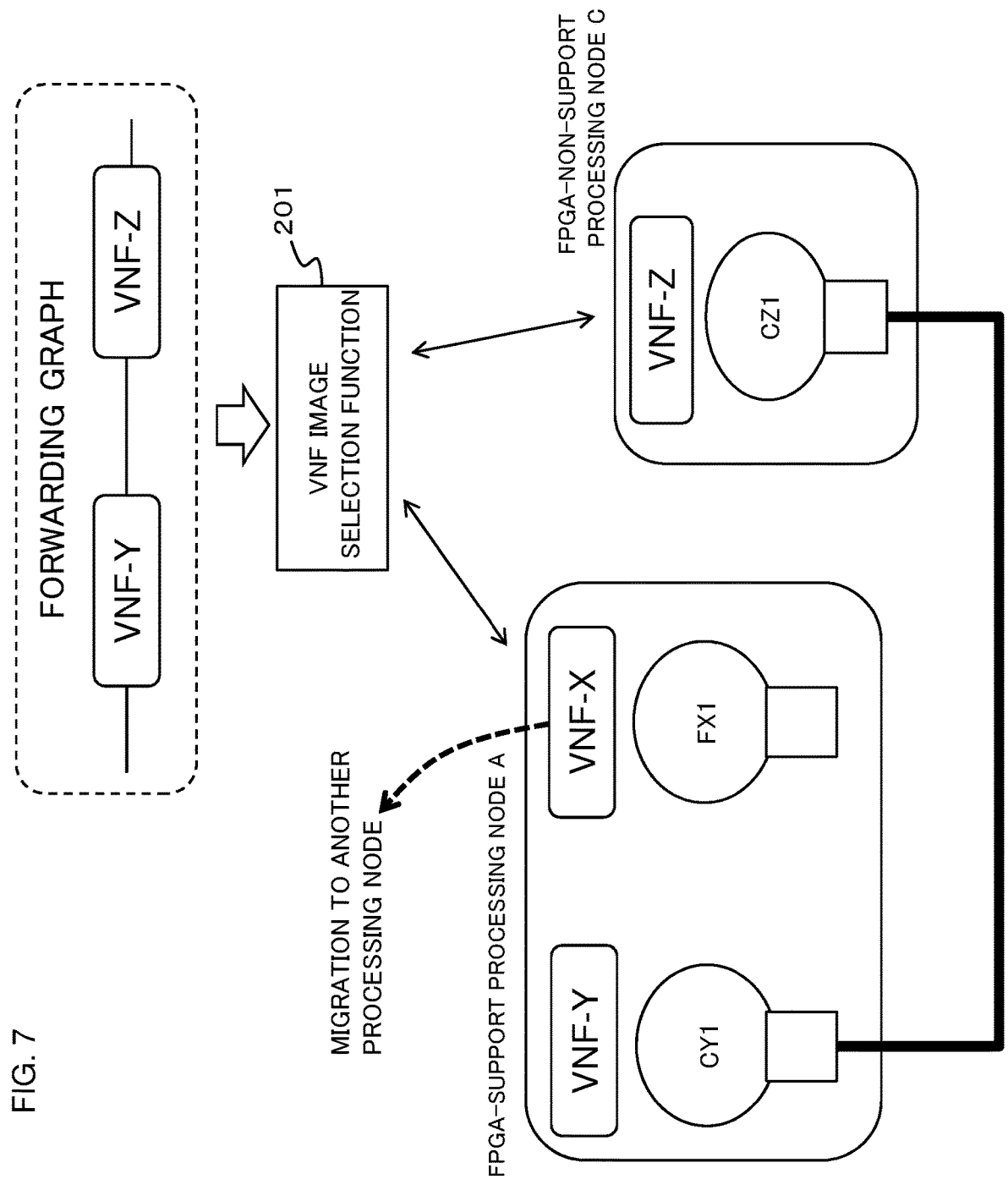
FIG. 7 is a schematic diagram showing an example of a yet-to-be-changed communication path with respect to a forwarding graph formed according to the present invention.

First, as shown in FIG. 7, it is assumed that the FPGA 21-2 in the FPGA-support processing node A is running a VNF-X in another forwarding graph. In such a state, when starting the VNF-Y and VNF-Z in a forwarding graph, the VNF image selection function 201 selects a VNF image CY1 of the CPU 21-1 in the FPGA-support processing node A and the VNF image CZ1 of a CPU in an FPGA-non-support processing node C, and connects the CPU 21-1 in the FPGA-support processing node A and the CPU of the FPGA-non-support processing node C through the network switch. Thus, a communication path that implements the forwarding graph VNF (Y-Z) can be formed.

Here it is assumed that when the forwarding graph VNF (Y-Z) has been implemented to provide predetermined network services (Y-Z), the VNF-X running on the FPGA in the FPGA-support processing node A is moved to another processing node through migration.

Figure 8:
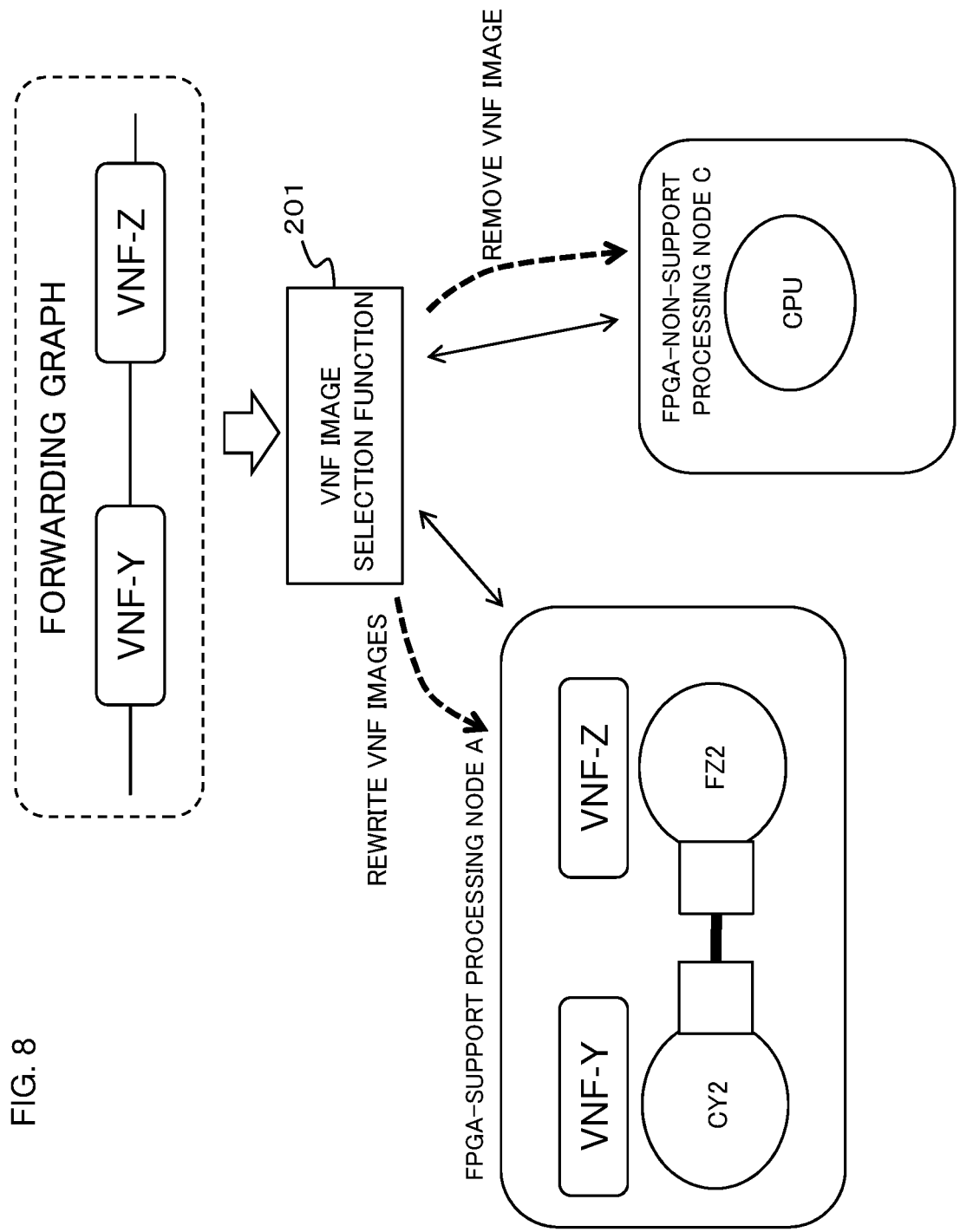
FIG. 8 is a schematic diagram showing a changed communication path with respect to the forwarding graph shown in FIG. 7.

The VNF image selection function 201, when recognizing that the FPGA of the FPGA-support processing node A has become available due to the migration, rewrites the VNF images of the CPU and FPGA in the processing node A so that the FPGA of the FPGA-support processing node A runs the VNF-Z running on the FPGA-non-support processing node C with using the high-speed interface between the CPU and FPGA, as shown in FIG. 8.

Referring to FIG. 8, the VNF image selection function 201 selects an efficient communication path that implements the same forwarding graph VNF (Y-Z), from the above VNF images. Since the forwarding graph is composed of the VNF-Y and VNF-Z, the VNF image selection function 201 selects a VNF image CY2 of the CPU 21-1 and a VNF image FZ2 of the FPGA 21-2 in the FPGA-support processing node A and couples the CPU 21-1 and FPGA 21-2 through the CPU-FPGA interface. Thus, a communication path that implements the forwarding graph VNF(Y-Z) can be formed. Since this communication path uses the high-speed CPU-FPGA interface, the communication path can further enhance the speed of communication, compared to communication through the network switch.

The communication paths as illustrated in FIGS. 5 to 8 are just an example. By selecting appropriate VNF images with respect to a desired forwarding graph, a communication path having the highest performance can be determined.

1.4) Advantageous Effects

As described above, according to the present embodiment, in addition to the communication interface between the processing nodes through the network, the following interfaces can be used: the communication interface between the CPU and FPGA; and the direct interface with the FPGA of other FPGA-support processing node. Thus, it is possible to select a high-speed communication path without passing through the network switch, allowing a desired forwarding graph to be implemented using the high-speed communication path.

2. EXAMPLES

2.1 First Example

A management apparatus 10 according to a first example of the present invention controls processing nodes and switches in a network system, and performs management of FPGAs, VMs, or VNFs and other management including path management which determines a communication path for a forwarding graph. The present example will be described below with reference to FIGS. 9 to 11.

As shown in FIG. 9, the management apparatus 10 includes a forwarding graph manager 101, a VNF image database 102, an FPGA manager 103, a physical connection path table 104, and a VNF image selector 105. The management apparatus 10 also includes a network interface 106 that connects with the processing nodes and switches in the above network system, a controller 107 that controls the operation of the management apparatus 10, and a program memory 108 that stores programs executed by the controller 107.

As illustrated in FIG. 10A, the forwarding graph manager 101 includes a management table indicating logical connections between VNFs (a forwarding graph) and operating entities to which the VNFs are mapped. According to this management table, for example, the VNF-X is mapped to the CPU of the processing node A and is connected to the VNF-Y, and the VNF-Y is mapped to the FPGA of the processing node A and is connected from the VNF-X to VNF-Z.

As illustrated in FIG. 10B, the VNF image database 102 stores the VNF images in advance. For example, when the VNF-X runs on a CPU, the VNF image database 102 stores the VNF image CX1 including an NIC-side interface, the VNF image CX2 including a CPU-FPGA interface, and the VNF image CX3 including a direct interface (see FIG. 4A). When the VNF-X runs on an FPGA, the VNF image database 102 stores the VNF image FX1 including an NIC-side interface, the VNF image FX2 including a CPU-FPGA interface, and the VNF image FX3 including a direct interface (see FIG. 4B). When the VNF-Y runs on a CPU, the VNF image database 102 stores the VNF images CY1, CY2, and CY3. When the VNF-Y runs on an FPGA, the VNF image database 102 stores the VNF images FY1, FY2, and FY3. The same applies to the VNF-Z and the VNF-W.

As illustrated in FIG. 11A, the FPGA manager 103 includes a management table indicating whether each processing node is of FPGA-support or not.

As illustrated in FIG. 11B, the physical connection path table 104 stores information indicating whether each processing node includes a CPU-FPGA communication interface and information indicating which processing node's FPGA is directly connected to the FPGA.

The VNF image selector 105 selects appropriate VNF images from the VNF image database 102 by referring to the forwarding graph and mapping information in the forwarding graph manager 101 and the physical connection paths in the physical connection path table 104, and determines a communication path most suitable to implement a forwarding graph. The operation of the VNF image selector 105 has been described with reference to FIGS. 5 to 8.

The controller 107 controls the operation of the function units, including the VNF image selector 105, by executing the program stored in the program memory 108.

2.2 Second Example

As with the first example, a management apparatus 10a according to a second example of the present invention performs path management where a communication path for a forwarding graph is determined. However, the management apparatus 10a differs from the first example in that the VNF images of an FPGA are generated from a source code. In general, in the case of forming different FPGA configuration images for respective communication paths in advance and managing them as shown in FIG. 10(B), the storage capacity cost is increased. Also, in the case of a wide variety of communication path patterns, there is a possibility where the patterns are expanded during operation. For this reason, according to the second example, only one source code for each VNF before compilation (logic synthesis, deployment and wiring) is previously stored, rather than FPGA configuration images themselves, and FPGA configuration images (VNF images) are synthesized at the time of implementation. This example will be described below with reference to FIGS. 12 and 13. Elements and functions similar to those in the first example are given the same reference signs and will not be described.

Figure 12:
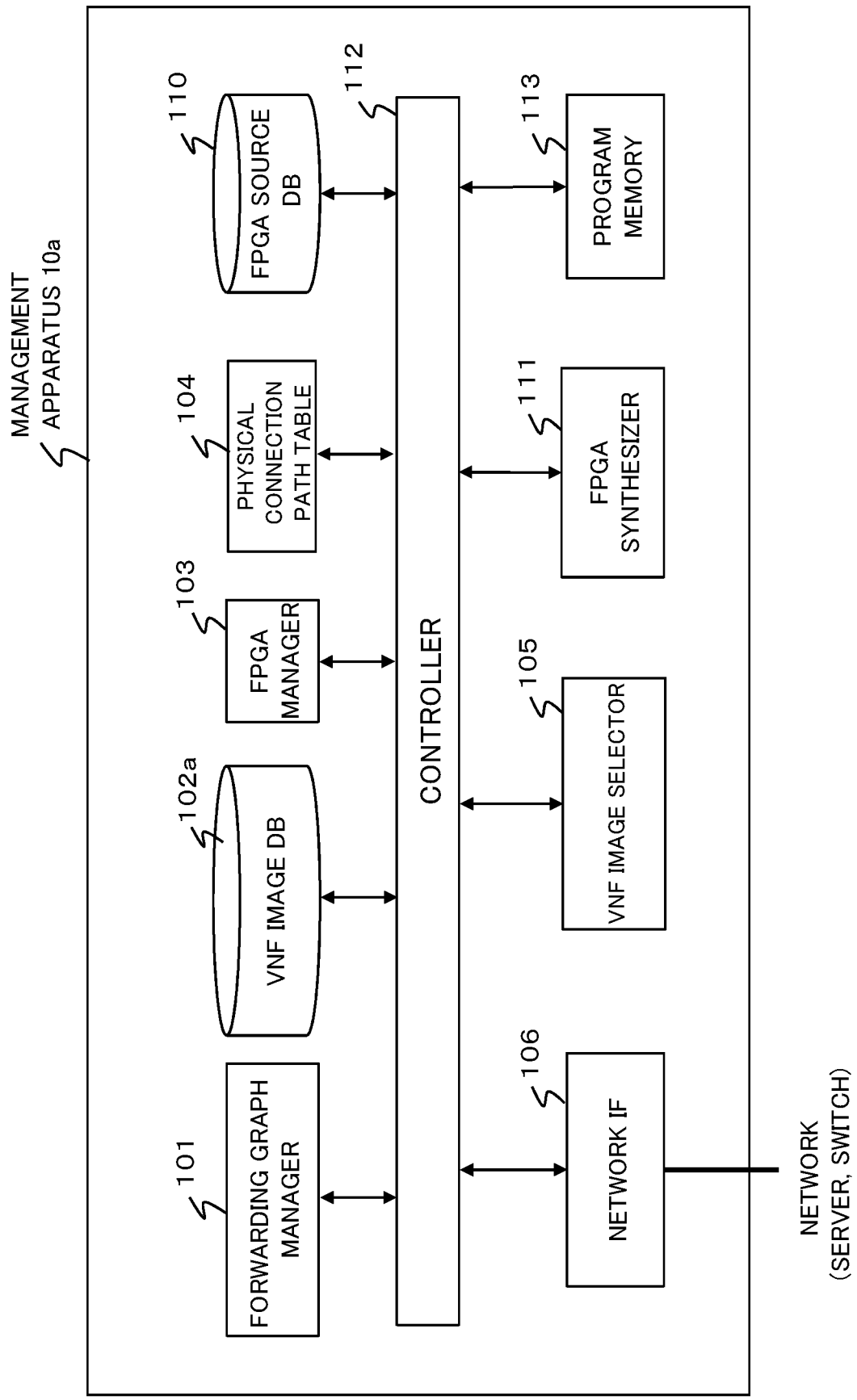
FIG. 12 is a block diagram showing the configuration of a management apparatus according to a second example of the present invention.

As shown in FIG. 12, the management apparatus 10a includes a forwarding graph manager 101, a VNF image database 102a, an FPGA manager 103, a physical connection path table 104, a VNF image selector 105, and a network interface 106. The management apparatus 10a also includes an FPGA source database 110, an FPGA synthesizer 111, a controller 112 that controls the operation of the management apparatus 10a, and a program memory 113 that stores programs executed by the controller 112. As described above, the VNF image database 102a of this example does not need a capacity required to store the FPGA-side VNF images as shown in FIG. 10(B). Instead, in this example, FPGA configuration images are synthesized from FPGA source codes corresponding to required VNFs.

Figure 13:
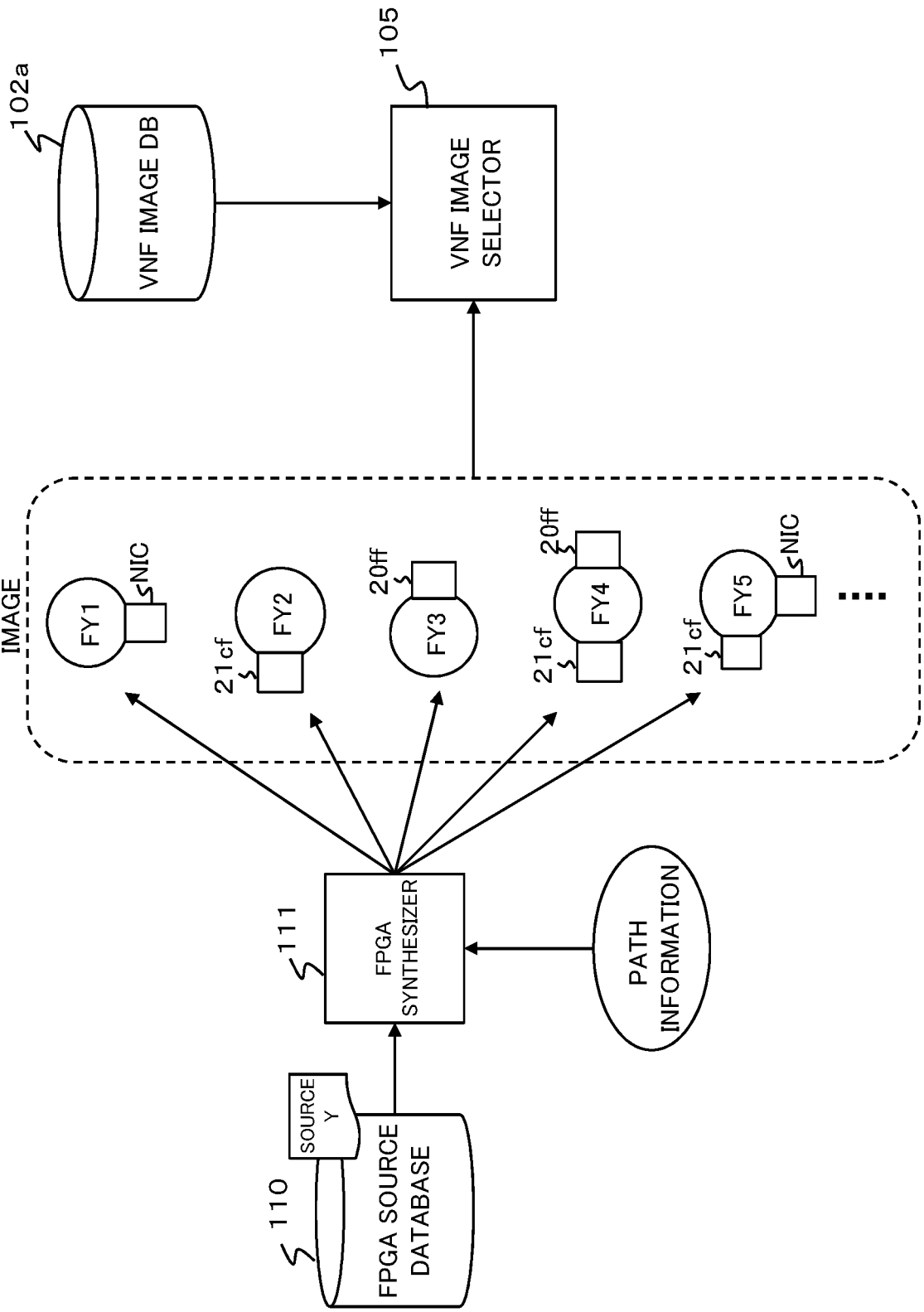
FIG. 13 is a schematic diagram showing an example of configuration images synthesized by an FPGA synthesizer in the management apparatus shown in FIG. 12.

As illustrated in FIG. 13, the controller 112 reads a source code Y of a VNF included in a forwarding graph from the FPGA source database 110 and outputs it to the FPGA synthesizer 111. When determining a communication path of the forwarding graph, the FPGA synthesizer 111 synthesizes multiple FPGA configuration images FY1, FY2, and so on by rewriting the source Y only with respect to its communication interface, on the basis of path information in the forwarding graph manager 101 and physical connection path table 104. The FPGA configuration images thus synthesized are output to the VNF image selector 105. The VNF image selector 105 determines a communication path most suitable for a forwarding graph by selecting appropriate VNF images from the VNF images stored in the VNF image database 102a and the synthesized FPGA configuration images.

Since the FPGA configuration images are synthesized from the source codes as described above, the capacity required to store those images is unnecessary. Also, it is possible to flexibly deal with even change or expansion of the communication path during operation.

3. OTHER EMBODIMENTS

In the above embodiment, the network system is centrally managed by the management apparatus 10. In the present invention, however, the network system need not be centrally managed, and the layers of a multilayer system may be managed by different managers in coordination with each other.

In the case of the managers that manage the respective layers, different devices connected such that they can communicate with each other may perform the management operations of the above embodiment in coordination with each other, or the managers may perform the management operations under the management of a higher-order device. The managers that control the respective layers may be provided in a single management apparatus, or a higher-order manager that manages the managers may be provided in a single management apparatus in a functionally separated manner.

While the invention has been particularly shown and described with reference to exemplary embodiments thereof, the invention is not limited to these embodiments. It will be understood by those of ordinary skill in the art that various changes in form and details may be made therein without departing from the sprit and scope of the present invention as defined by the claims.

4. SUPPLEMENTARY NOTES

Part or all of the above embodiment may also be described as the following supplementary notes, but is not limited thereto.

Supplementary Note 1

A network system in which at least one virtual network function can be deployed, including:

a plurality of processing units that are able to run a plurality of virtual network functions, respectively; and a management apparatus that determines a communication path to deploy desired virtual network functions, wherein each of the plurality of processing units is provided with at least one of a plurality of types of communication interfaces, and the management apparatus determines the communication path to deploy the desired virtual network functions, in accordance with communication interfaces through which each processing unit is connectable with another processing unit.

Supplementary Note 2

The network system of supplementary note 1, wherein the management apparatus selects the communication path from possible candidates for communication path according to the communication interfaces of the processing units.

Supplementary Note 3

The network system of supplementary note 1 or 2, wherein the a plurality of processing units include at least one processing unit which is provided with a first communication interface to a network switch and a direct communication interface to another processing unit.

Supplementary Note 4

The network system of any one of supplementary notes 1 to 3, wherein the processing unit is either a central processing unit (CPU) or a programmable logic circuit in a processing node including the processing unit.

Supplementary Note 5

A management apparatus of a network system in which at least one virtual network function can be deployed, wherein a plurality of processing units that are able to run a plurality of virtual network functions, respectively, are provided with at least one of a plurality of types of communication interfaces, the management apparatus comprising:

a storage means that retains virtual network function images for each of the virtual network functions, the virtual network function images corresponding to communication interfaces of each processing unit; and a control means that determines a communication path to deploy desired virtual network functions, by selecting the virtual network function images.

Supplementary Note 6

The management apparatus of supplementary note 5, wherein the storage means retains virtual network function images corresponding to possible combinations of communication interfaces of the processing unit for each virtual network function.

Supplementary Note 7

The management apparatus of supplementary note 5 or 6, wherein the control means selects the communication path from possible candidates for communication path according to the virtual network function images.

Supplementary Note 8

The management apparatus of any one of supplementary notes 5 to 7, wherein the plurality of processing units include at least one processing unit which is provided with a first communication interface to a network switch and a direct communication interface to another processing unit.

Supplementary Note 9

The management apparatus of any one of supplementary notes 5 to 8, wherein the processing unit is either a central processing unit (CPU) or a programmable logic circuit of a processing node including the processing unit.

Supplementary Note 10

The management apparatus of supplementary note 9, further including: a source code storage means that stores a source code for forming virtual network function images of the programmable logic circuits for each virtual network function; and a synthesizing means that synthesizes the virtual network function images from the source code and connection relationships between the desired virtual network functions and the processing units.

Supplementary Note 11

A management method of a network system in which at least one virtual network function can be deployed, wherein a plurality of processing units that are able to run a plurality of virtual network functions, respectively, are provided with at least one of a plurality of types of communication interfaces, the management method comprising:

storing, by a storage means, virtual network function images for each of the plurality of virtual network functions, the virtual network function images corresponding to communication interfaces of the processing units; and determining, by a control means, a communication path to deploy desired virtual network functions, by selecting the virtual network function images.

Supplementary Note 12

The management method of supplementary note 11, wherein the storage means retains virtual network function images corresponding respectively to possible combinations of the communication interfaces of the processing units, for each virtual network function.

Supplementary Note 13

The management method of supplementary note 11 or 12, wherein the control means selects the communication path from possible candidates for communication path according to the virtual network function images.

Supplementary Note 14

The management method of any one of supplementary notes 11 to 13, wherein the plurality of processing units are provided with at least one of a first communication interface to a network switch and a direct communication interface to another processing unit.

Supplementary Note 15

The management method of any one of supplementary notes 11 to 14, wherein the processing unit is either a central processing unit (CPU) or a programmable logic circuit of a processing node including the processing unit.

Supplementary Note 16

The management method of supplementary note 15, wherein a source code storage means stores a source code for forming virtual network function images of the programmable logic circuit for each virtual network function, and a synthesizing means synthesizes the virtual network function images from the source code and connection relationships of the programmable logic circuit.

Supplementary Note 17

A program for causing a computer to function as a management apparatus of a network system in which at least one virtual network function can be deployed, wherein a plurality of processing units that are able to run a plurality of virtual network functions, respectively, are provided with at least one of a plurality of types of communication interfaces, the program causing the computer to implement:

a function of storing, by a storage means, virtual network function images for each virtual network function, the virtual network function images corresponding to communication interfaces of the processing unit; and a function of determining, by a control means, a communication path to deploy desired virtual network functions, by selecting the virtual network function images.

INDUSTRIAL APPLICABILITY

The present invention can be used in systems where virtual network functions (VNFs) are deployed on a network.

DESCRIPTION OF REFERENCE SIGNS

A, B: FPGA-support processing node
C: FPGA-non-support processing node
X,Y,Z,W: virtual network function (VNF)
CX, FY, CY, CZ, FW, FZ: VNF image
10: management apparatus
20: lower-layer network
20ff: direct interface
21-1: CPU
21-2: FPGA
21cf: CPU-FPGA communication interface
22-1: CPU
22-2: FPGA
22cf: CPU-FPGA communication interface
23: network switch
30: upper-layer network
101: forwarding graph manager
102: VNF image database
103: FPGA manager
104: physical connection path table
105: VNF image selector
106 network interface
107 controller
108: program memory
110: FPGA source database
111: FPGA synthesizer
112 controller
113: program memory
201: VNF image selection function

The invention claimed is:

1. A network system in which at least one virtual network function can be deployed, comprising:
a plurality of processing units on each of which a desired virtual network function can be set, wherein the plurality of processing units include at least one central processing unit and at least one programmable logic circuit; and
a management apparatus that determines a communication path that connects the plurality of processing units so as to deploy a set of desired virtual network functions,
wherein at least one of the plurality of processing units includes a first communication interface that is connectable between different processing units and a second communication interface that is directly connectable between different programmable logic circuits, and
wherein the management apparatus determines the communication path for deploying the set of desire virtual network functions, in accordance with respective connectable communication interfaces of the processing units,
wherein the management apparatus selects the communication path from possible candidates for communication path causing a plurality of virtual network functions to be formed, according to the respective communication interfaces of the processing units.

2. The network system of claim 1, wherein
each of the processing units is connected to a network switch through the first communication interface, and
a first programmable logic circuit of the at least one processing unit is directly connected to a second programmable logic circuit of a different processing unit through the second communication interface.

3. The network system of claim 1, wherein the processing unit is one of a central processing unit (CPU) and a programmable logic circuit in a processing node including the processing unit.

4. The network system of claim 3, wherein the processing node is one of a first type of processing node including the CPU and a second type of processing node including both the CPU and the programmable logic circuit.

5. A management apparatus of a network system in which at least one virtual network function can be deployed, wherein the network system includes a plurality of processing units on each of which a desired virtual network function can be configured, wherein the plurality of processing units include at least one central processing unit and at least one programmable logic circuit,
wherein at least one of a plurality of processing units includes a first communication interface that is connectable between different processing units and a second communication interface that is directly connectable between different programmable logic circuits,
the management apparatus comprising:
a database that stores virtual network function images for each virtual network function, wherein the virtual network function images are formed from possible combinations of communication interfaces of each processing unit; and
a controller that is configured to:
determine a communication path so as to deploy a set of desired virtual network functions, by selecting the virtual network function images; and
select the communication path from possible candidates for communication path causing a plurality of virtual network functions to be formed, according to the virtual network function images.

6. The management apparatus of claim 5, wherein
each of the processing units is connected to a network switch through the first communication interface, and
a first programmable logic circuit of the at least one processing unit is directly connected to a second programmable logic circuit of a different processing unit through the second communication interface.

7. The management apparatus of claim 5, wherein the processing unit is one of a central processing unit (CPU) and a programmable logic circuit in a processing node including the processing unit.

8. The management apparatus of claim 7, further comprising:
a source code database that stores a source code for creating virtual network function images of a programmable logic circuit for each of the virtual network functions; and a synthesizer that synthesizes the virtual network function images from the source code and connection relationships between the desired virtual network function and the processing unit.

9. The management apparatus of claim 7, wherein the processing node is one of a first type of processing node including the CPU and a second type of processing node including both the CPU and the programmable logic circuit.

10. A management method of a network system in which at least one virtual network function can be deployed, wherein the network system includes a plurality of processing units on each of which a desired virtual network function can be configured, wherein the plurality of processing units include at least one central processing unit and at least one programmable logic circuit,
- wherein at least one of a plurality of processing units includes a first communication interface that is connectable between different processing units and a second communication interface that is directly connectable between different programmable logic circuits,
- the management method comprising:
- storing, by a database, virtual network function images for each virtual network function, wherein the virtual network function images are formed from possible combinations of communication interfaces of each processing unit;
- determining, by a controller, a communication path so as to deploy a set of desired virtual network functions, by selecting the virtual network function images; and
- selecting, by the controller, the communication path from possible candidates for a communication path causing a plurality of virtual network functions to be formed, according to the virtual network function images.

11. The management method of claim 10, wherein
- each of the processing units is connected to a network switch through the first communication interface, and
- a first programmable logic circuit of the at least one processing unit is directly connected to a second programmable logic circuit of a different processing unit through the second communication interface.

12. The management method of claim 10, wherein the processing unit is one of a central processing unit (CPU) and a programmable logic circuit of a processing node including the processing unit.

13. The management method of claim 12, further comprising:
- by a source code database, storing a source code for creating virtual network function images of the programmable logic circuit for each of the virtual network functions, and
- by a synthesizer, synthesizing the virtual network function images from the source code and connection relationships of the programmable logic circuit.

14. The management method of claim 12, wherein the processing node is one of a first type of processing node including a CPU and a second type of processing node including both the CPU and the programmable logic circuit.

* * * * *